US012206466B2

(12) United States Patent
Pickering et al.

(10) Patent No.: US 12,206,466 B2
(45) Date of Patent: *Jan. 21, 2025

(54) WIRELESS COMMUNICATION BETWEEN ELECTRONIC DEVICES IN CLOSE PROXIMITY

(71) Applicant: Worldpay Limited, London (GB)

(72) Inventors: Daren Pickering, Rugby (GB); Nicholas Telford-Reed, Bassingborn (GB)

(73) Assignee: Worldpay Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/360,001

(22) Filed: Jul. 27, 2023

(65) Prior Publication Data

US 2023/0370118 A1 Nov. 16, 2023

Related U.S. Application Data

(63) Continuation of application No. 18/152,398, filed on Jan. 10, 2023, now Pat. No. 11,757,493, which is a
(Continued)

(30) Foreign Application Priority Data

Dec. 7, 2017 (GB) ...................................... 1720415

(51) Int. Cl.
*H04B 5/00* (2024.01)
*G06K 7/10* (2006.01)
(Continued)

(52) U.S. Cl.
CPC ........... *H04B 5/77* (2024.01); *G06K 19/0712* (2013.01); *H04B 5/72* (2024.01)

(58) Field of Classification Search
None
See application file for complete search history.

(56) References Cited

U.S. PATENT DOCUMENTS 6,763,996 B2 * 7/2004 Rakers ................. G06K 7/0008
235/375
6,784,813 B2 * 8/2004 Shanks ................. G06K 7/0008
235/435
(Continued)

FOREIGN PATENT DOCUMENTS

CN 101122945 A 2/2008
CN 101438331 A 5/2009
(Continued)

OTHER PUBLICATIONS

First Office Action issued in Chinese Application No. 202210253800.9 dated Nov. 2, 2022 (9 pages).
(Continued)

*Primary Examiner* — Tuan A Tran
(74) *Attorney, Agent, or Firm* — Bookoff McAndrews, PLLC

(57) ABSTRACT

A method of communicating between a first electronic communication device of a plurality of electronic communication devices and a wireless communication initiating device for reading the first electronic communication device. The method comprises receiving, at the first electronic communication device, a communication signal from the wireless communication initiating device and determining a first characteristic value relating to the communication signal. The method further comprises receiving at least a second characteristic value relating to a communication signal received by at least a second electronic communication device that is connected to the first electronic commu-
(Continued)

nication device and initiating communication with a reading device based on the first and second value.

20 Claims, 9 Drawing Sheets

Related U.S. Application Data continuation of application No. 17/741,284, filed on May 10, 2022, now Pat. No. 11,616,534, which is a continuation of application No. 17/566,452, filed on Dec. 30, 2021, now Pat. No. 11,539,402, which is a continuation of application No. 16/767,500, filed as application No. PCT/GB2018/053558 on Dec. 7, 2018, now Pat. No. 11,265,042.

(51) Int. Cl.
*G06K 19/07* (2006.01)
*H04B 5/72* (2024.01)
*H04B 5/77* (2024.01)

(56) References Cited

U.S. PATENT DOCUMENTS

| | | | | |
|---|---|---|---|---|
| 7,023,817 B2 * | 4/2006 | Kuffner | ............... | G06K 7/0008 370/324 |
| 7,057,511 B2 * | 6/2006 | Shanks | ............... | G06K 7/0008 340/572.1 |
| 7,199,716 B2 * | 4/2007 | Shanks | ............... | G06K 7/0008 340/572.1 |
| 7,961,078 B1 * | 6/2011 | Reynolds | ............. | G06K 7/0008 340/10.2 |
| 8,004,387 B2 * | 8/2011 | Childress | ............. | G06Q 10/087 340/5.92 |
| 8,279,047 B2 * | 10/2012 | Carrender | ............. | H04W 74/00 340/10.4 |
| 8,330,580 B2 * | 12/2012 | Reynolds | ........... | G06K 7/10297 340/10.2 |
| 8,421,598 B1 | 4/2013 | Dacus et al. | | |
| 8,519,848 B2 * | 8/2013 | Stern | ................... | G06Q 10/087 340/572.1 |
| 8,570,172 B2 * | 10/2013 | Al-Mahdawi | .......... | H04B 17/27 340/572.1 |
| 8,742,899 B2 * | 6/2014 | Smith | ................ | G06K 7/10039 340/10.32 |
| 8,768,952 B2 * | 7/2014 | Smith | .................. | G06K 7/0008 707/769 |
| 8,893,969 B2 * | 11/2014 | Brandl | ............... | G06K 7/10059 235/385 |
| 9,036,505 B2 * | 5/2015 | Ripstein | .................. | H04W 8/26 370/254 |
| 9,483,671 B2 * | 11/2016 | Smith | ................ | G06K 7/10009 |
| 9,552,539 B2 * | 1/2017 | Moran | ................ | G06K 7/0008 |
| 9,754,143 B2 * | 9/2017 | Daneshmand | ..... | G06K 7/10029 |
| 9,773,132 B2 * | 9/2017 | Lee | ...................... | G06K 7/0095 |
| 10,019,613 B1 * | 7/2018 | DeBates | ............ | G06K 7/10396 |
| 10,296,768 B2 * | 5/2019 | Bermudez Rodriguez | .................. | G06Q 10/087 |
| 2006/0238301 A1 | 10/2006 | Wu et al. | | |
| 2014/0187153 A1 | 7/2014 | Zhu et al. | | |
| 2017/0100056 A1 | 4/2017 | Zhu et al. | | |
| 2017/0118685 A1 | 4/2017 | Jollota et al. | | |

FOREIGN PATENT DOCUMENTS

| | | |
|---|---|---|
| CN | 102017486 A | 4/2011 |
| CN | 102160293 A | 8/2011 |
| CN | 102385684 A | 3/2012 |
| CN | 102763119 A | 10/2012 |
| CN | 103268463 A | 8/2013 |
| EP | 2160699 A1 | 3/2010 |
| KR | 101509151 B1 | 4/2015 |

OTHER PUBLICATIONS

International Search Report and Written Opinion issued in International Application No. PCT/GB2018/053558, issued Mar. 18, 2019 (16 pages).
G. Broll and D. Hausen, "Mobile and Physical User Interfaces for NFC-based Mobile Interaction with Multiple Tags," MobileHCI10, Sep. 7-10, 2010 (Sep. 7, 2010).
G. Khadka and S. Hwang, "Tag-to-Tag Interference Suppression Technique Based on Time Division for RFID," Sensors, vol. 17, No. 78, 2017 (Jan. 1, 2017).

* cited by examiner

WIRELESS COMMUNICATION BETWEEN ELECTRONIC DEVICES IN CLOSE PROXIMITY

CROSS-REFERENCE TO RELATED APPLICATION(S)

This patent application is a continuation of and claims the benefit of priority to U.S. Non-provisional patent application Ser. No. 18/152,398, filed on Jan. 10, 2023, which is a continuation of U.S. Non-provisional patent application Ser. No. 17/741,284, filed on May 10, 2022, which is a continuation of U.S. Non-provisional patent application Ser. No. 17/566,452, filed on Dec. 30, 2021, which is a continuation of U.S. Non-provisional patent application Ser. No. 16/767,500, filed on May 27, 2020, which claims the benefit of priority to PCT/GB2018/053558, filed on Dec. 7, 2018, which claims the benefit of priority to G.B. Patent Application No. 1720415.7, filed on Dec. 7, 2017, the entireties of which are incorporated herein by reference.

The present invention relates to wireless communication between electronic devices that are in close proximity to each other and in particular to a selective communication between an electronic wireless communication initiating device and an electronic wireless communication device of a plurality of electronic wireless communication devices that have short range communication capabilities.

Existing short range radio communication schemes allow two devices to communicate with each other when in close proximity. One example of a short range communication scheme is near field communication (NFC) where two NFC chips or tags can communicate with each other at a maximum of a few (e.g. ten) centimetres. In one particular implementation, NFC communication can operate under the ISO/IEC 18092 standard at 13.56 MHz up to 10 cm although other implementations will be apparent to those skilled in the art. This technology enables communication among electronic devices brought within close range of each other.

NFC communication normally takes place between a pair of devices: at least one of these devices is the active device in that it generates its own electromagnetic field and has a power supply; the other device can be either another active device or a passive device which retrieves power from the active device.

In the arrangement with an active and passive device, the active device is typically an initiating device and will send a message to the passive device which is a target device. The target device will be powered through inductive coupling and will send back a reply. It will be apparent to those skilled in the art that the target device needs to be within sufficient range of the electromagnetic field of the initiating device in order to be powered and communicate with the initiating device.

Under short range radio communication schemes such as NFC, there is a drawback of the relative position between the devices having to be more precise than in longer range wireless communication in order to initiate communication between the two devices. In particular, for NFC communication, the area on a NFC-enabled electronic device from where NFC communication is to be initiated can be difficult to locate given the limited range of NFC communication particularly if the area within which a NFC chip or tag is located is relatively large. This can make the process of communicating between NFC devices or other devices that rely on short range communication, particularly over a large surface area, somewhat time consuming and cumbersome as the relative positioning of the two devices would need to be moved around a significant amount before communication can be initiated.

It would be desirable to provide a mechanism for quick and easy short range communication between wireless communication devices over a large surface area.

The inventors have found that a plurality of electronic communication devices can be provided in an array and only one of the plurality of the electronic communication devices will be selected for communication with a wireless communication initiating device based upon the most reliable communication signal being received from the wireless communication initiating device. The reliability of the communication signal may be based on the position of each of the plurality of electronic devices relative to the position of the communication initiating device. The selection is carried out automatically by the electronic communication devices.

From a first aspect, the invention provides electronic wireless communication device comprising: a wireless communication means for communicating with a wireless communication initiating device; means for monitoring a communication signal received by the wireless communication means; means for sending at least a first characteristic value relating to the communication signal received by the wireless communication means to at least one other electronic wireless communication device; means for receiving at least a further characteristic value relating to a communication signal received by the at least one other electronic wireless communication device; and processing means for carrying out a comparison based on the first characteristic value and the further characteristic value, wherein the electronic wireless device is configured to selectively activate communication with the wireless communication initiating device based on the result of the comparison.

In one embodiment, if the first characteristic value is higher than the further characteristic value, the electronic communication device will further communicate with the wireless communication initiating device, otherwise, the electronic communication device will not further communicate with the wireless communication initiating device.

The wireless communication means can be an antenna that may be made of metal.

The monitoring means and processing means can be communicatively coupled to wireless communication means and sending and receiving means.

Electronic communication device may have a plurality of layers, the wireless communication means being provided on a first layer, and the means for sending or receiving being provided on a second layer separated from the first layer through insulation.

The monitoring means and processing means can be provided in a microprocessor or microcontroller chip which extends through each of the layers of the plurality of layers.

The receiving means may receive a plurality of further characteristic values relating to reliability of a communication signal received by a plurality of other electronic communication devices. In this case, a comparison is made between the first characteristic value and the further characteristic values and either the electronic communication device or one of the plurality of other electronic communication devices will further communicate with the wireless communication initiating device dependent on the result of the comparison.

In a second aspect, the present invention provides a system for communicating between a first electronic communication device of a plurality of electronic communication devices and an electronic reading device for reading the electronic communication device, the system comprising a plurality of the aforementioned electronic communication devices arranged in an array covering a predetermined area. At least some of the electronic devices in the area can be arranged adjacent to each other.

Each electronic communication device may be substantially the same thereby providing the same functionality.

The electronic communication devices can be arranged in the array such that the edge of any one electronic communication device is adjacent an edge of other electronic communication devices within boundaries of the predetermined area.

The electronic devices may be located on a surface in a planar array, for example, a honeycomb array.

In a third aspect, the present invention provides a method of communicating between a first electronic communication device of a plurality of electronic communication devices and a wireless communication initiating device for reading the first electronic communication device, the method comprising:

a. receiving, at the first electronic communication device, a communication signal from the wireless communication initiating device;
b. determining a first characteristic value relating to the communication signal;
c. receiving at least a second characteristic value relating to a communication signal received by at least a second electronic communication device that is connected to the first electronic communication device,
d. initiating communication with the reading device based on the first and second value.

The method may further comprise bringing the electronic reading device into close proximity to at least one of the electronic communication devices;

The electronic communication device can take a number of form factors including but not limited to an electronic card, mobile computing device, payment terminal, tag and/or sticker.

In some embodiments, the wireless communication is near field communication (NFC). The electronic device can be a NFC tag or sticker and the wireless communication initiating device is a NFC reading device.

Further optional features can be found in the appended dependent claims.

BRIEF DESCRIPTION OF THE DRAWINGS

Embodiments of the present invention are now described, by way of example only, with reference to the accompanying drawings, in which:

FIG. 1 shows a schematic diagram of a conventional system suitable for providing short range wireless communication between two electronic communication devices. In this system, a conventional near field communication (NFC) passive (as opposed to active) tag 10 is shown along with a NFC reading device 20 which can be, for example, a conventional mobile communication device.

Figure 1:
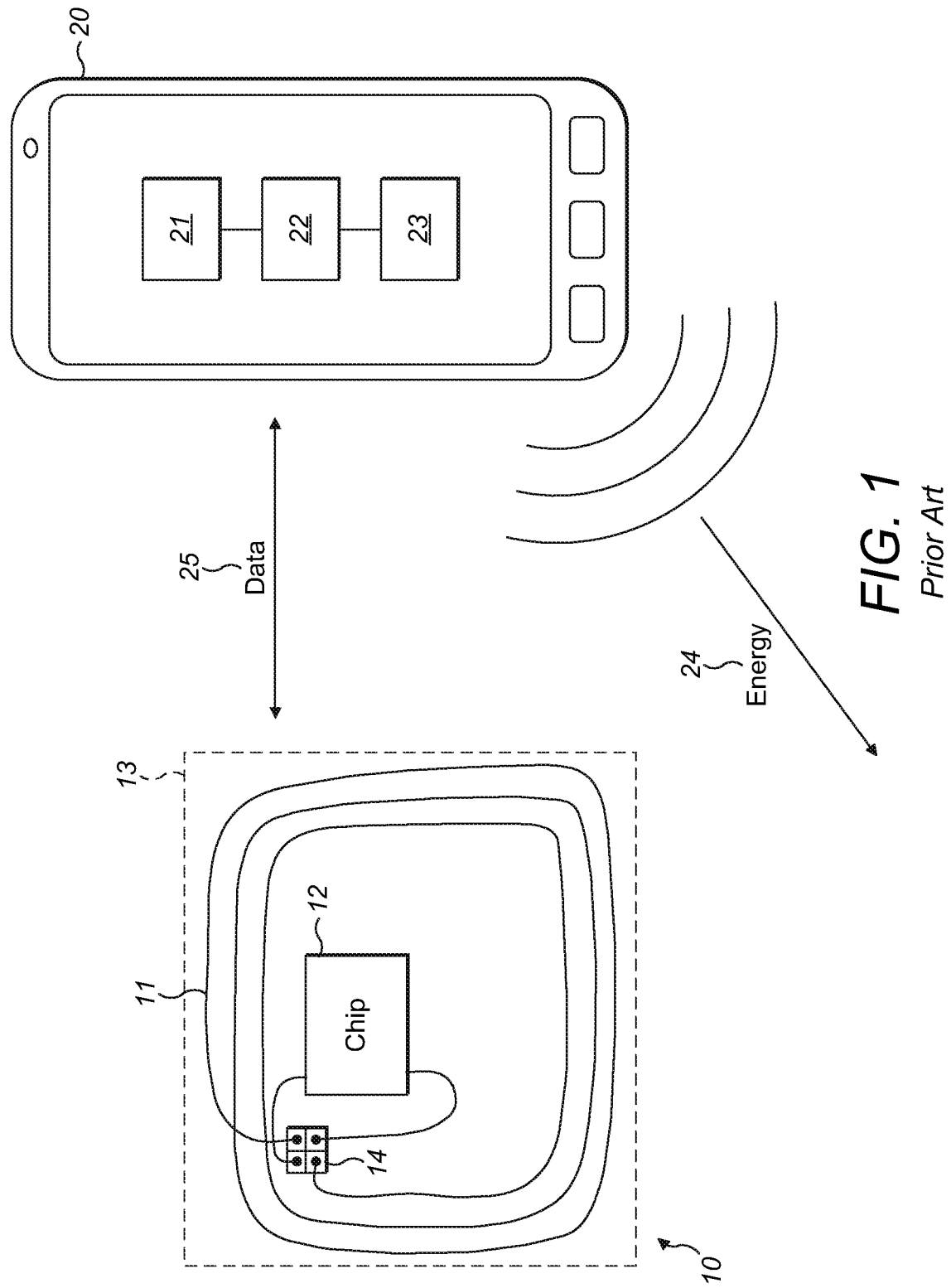
FIG. 1 is a diagram of a conventional system suitable for providing short range wireless communication between two electronic communication devices.

In a conventional system such as FIG. 1, a NFC tag 10 contains a NFC antenna 11 and a main microprocessor chip 12. The antenna 11 typically has a loop structure contained within a boundary 13 of the tag. The tag 10 may further include an antenna connector 14 to provide an interface between the antenna 11 and the chip 12. Both the antenna 11 and chip 12 are electrically connected to the antenna connector 14.

A NFC tag reader 20 comprises a housing containing a wireless communications means such as an antenna 21, a NFC controller 22 which could be a microcontroller that controls the signal to be transmitted by the antenna 21, and a power supply 23. In this conventional system, the card reader 20 is shown as a mobile communication device. In use, NFC tag reader 20 emits electromagnetic energy which is preferably radio energy 24 that will cause the NFC tag 10 to become active. When a signal representative of the electromagnetic energy is received by the antenna 11 on the tag 10, this signal is used to power the chip 12 and data communication 25 between the tag 10 and the NFC tag reader can take place.

Figure 2:
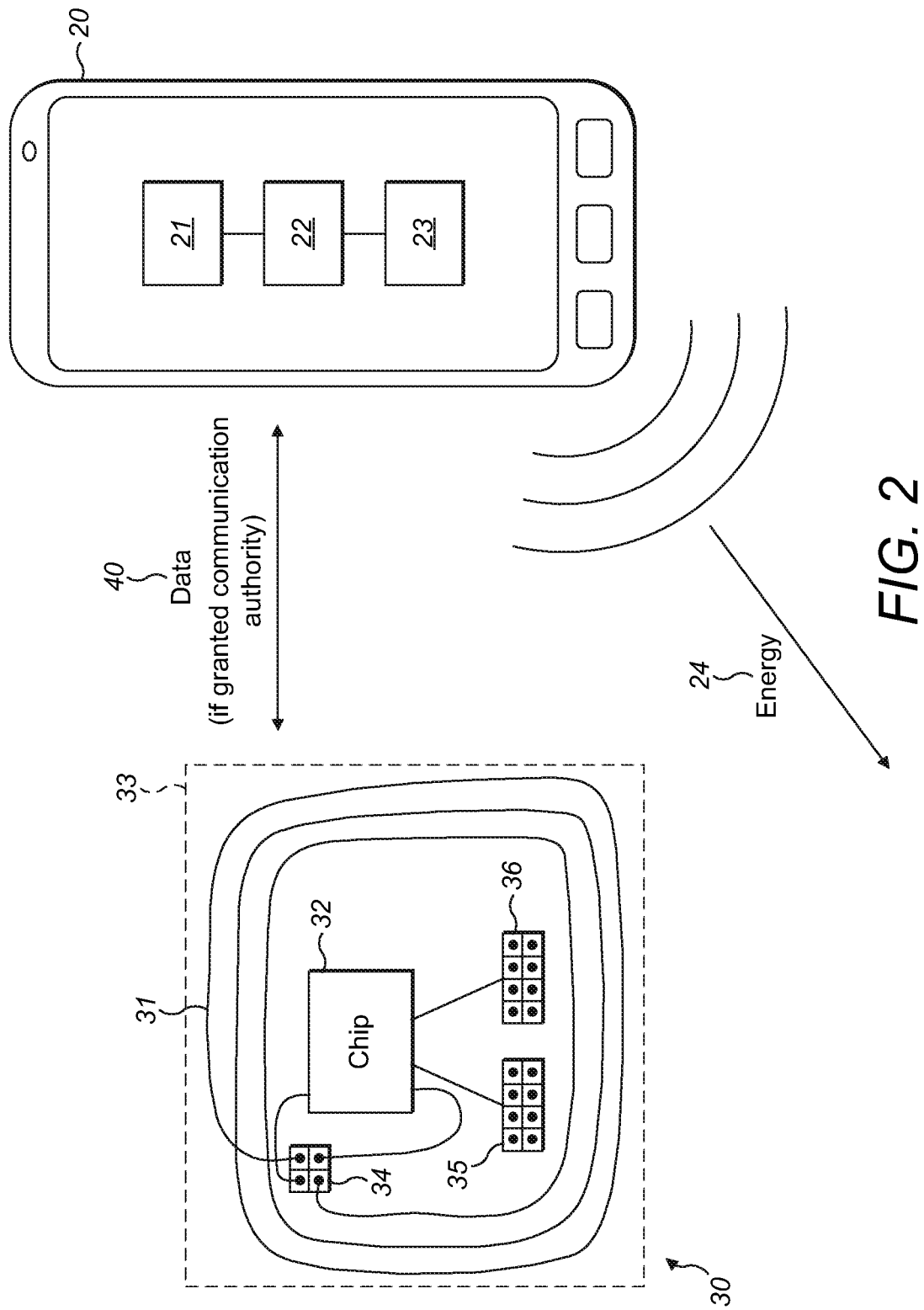
FIG. 2 is a diagram of a system suitable for providing short range wireless communication between two electronic communication devices, according to a first embodiment.

FIG. 2 shows a schematic diagram of a system suitable for providing short range wireless communication between two electronic communication devices, according to a first embodiment. In this system, a near field communication (NFC) passive tag 30 is shown along with a conventional NFC reading device 20 which can be, for example, a conventional mobile communication device as in the conventional system shown and described in relation to FIG. 1.

A NFC tag 30 contains a NFC antenna 31 and a main microprocessor chip 32. The antenna 31 typically has a loop structure contained within a boundary 33 of the tag. The tag 30 may further include an antenna connector 34 to provide an interface between the antenna 31 and the chip 32. Both the antenna 31 and chip 32 are electrically connected to the antenna connector 34. In some other embodiments, the antenna may be directly connected to the chip.

As in the FIG. 1, a NFC tag reader 20 comprises a housing containing a wireless communications means such as an antenna 21, a NFC controller 22 which could be a microcontroller that controls a communication signal to be transmitted by the antenna 21, and a power supply 23. The communication signal in this embodiment is NFC electromagnetic energy in the form a radio wave according to the NFC protocol, therefore, at a frequency of 13.56 MHz. The card reader 20 is shown as a mobile communication device but it can be any other device with wireless communication capabilities to power a tag when in close proximity to the tag. For example, this is typically within a few centimetres (e.g. 10 cm).

In this embodiment, and differently to the conventional tag shown in FIG. 1, the tag 30 comprises input connection means 35 for receiving data and output connection means 36 for sending data. Each of the connection means 35,36 can take the form of an interface that provides electrical ports or connections. The connection means 35, 36 enables the tags 30 to be electrically connected to other neighbouring tags. The connection is preferably wired (i.e. not wireless), and allows data can be communicated between the tag 30 and neighbouring tags. The connection could be provided by electrical tracks between the tag 30 and neighbouring tags or another type of wired communication medium.

The chip 32 in operable to monitor the signal received by the antenna 31 and is operable to monitor the signal of other tags connected to the connection means 35, 36 and neighbouring the tag 30. In use, NFC tag reader 20 emits electromagnetic energy which is preferably radio energy 24 that will cause the NFC tag 30 to become active when in close proximity. When a signal representative of the electromagnetic energy is received by the antenna 31 on the tag 30, this signal is used to power the chip 32 and data communication 25 between the tag 30 and the NFC tag reader 20 can selectively take place. A tag will only respond to a request from a reader 20 and be selectively activated when it is determined that it is the tag amongst its group of neighbours that has the best signal and is therefore probably closest to the reader 20. All tags that are not deemed to have the strongest signal will remain silent. By silence, it is meant that the tag can provide selective activation and will be self-deactivated or deactivated by another tag so as to not reply to the signal from the tag reader 20. In particular, this allows any active neighbouring tags the capability to send numerical values of energy registered, and to send the value for the tag's own energy to the other tags. A comparison of the values of energy registered can be made and only the tag deemed to have the best energy rating will respond to the NFC reader 20. In particular, the values are used to either reply to the reader if the value of one tag is deemed to be more suitable to reply than its neighbours, or to ignore the reader if it is deemed to have a weaker signal than its neighbours. Depending upon the layout of tags, this may or may not mean switching off the antenna connection to the chip 32 as well as ignoring the reader 20 when a neighbouring tag is in charge of replying.

A plurality of NFC tags can be provided in a network in an embodiment. In particular, the tags are arranged in a closely packed array or grid. The tags are connected to neighbouring tags through electrical connections via connection means 35, 36. In the embodiment shown, eight ports are provided in each of the input connection means 35 and the output connection means 36 because there are eight neighbouring tags for each tag in the particular grid arrangement.

In an embodiment shown in FIG. 2, eight ports are provided in each of the input connection means 35 and output connection means 36 as there are eight neighbouring tags for each tag in the particular grid arrangement. It will be appreciated to those skilled in the art with the benefit of the present disclosure that other number of ports can be provided. Indeed, fewer ports may be provided for tags that have different shapes where fewer tags will be neighbouring. Furthermore, ports may provide two way communication such that only eight ports are required to send and receive from eight neighbouring tags.

Figure 3:
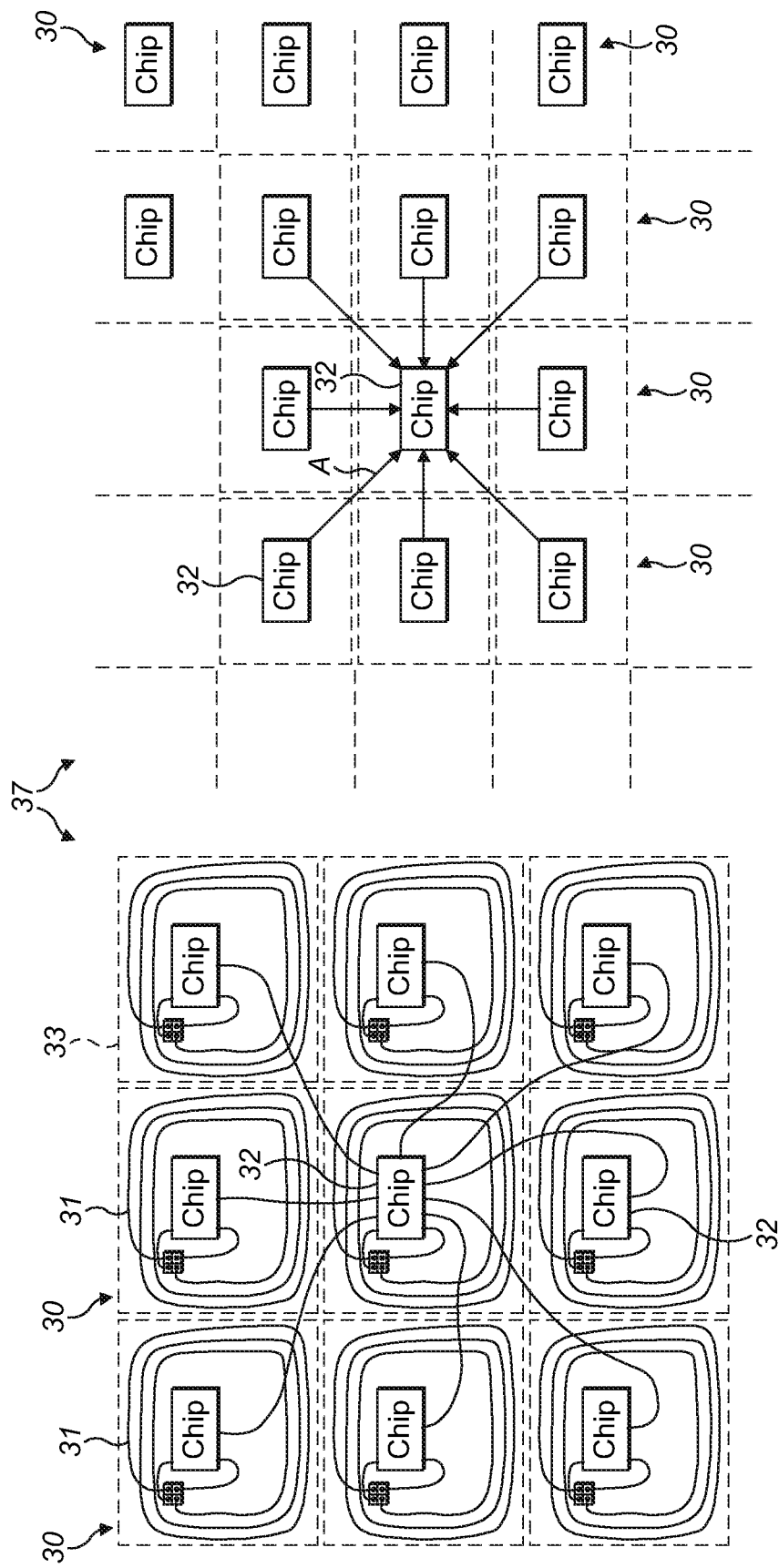
FIG. 3 is a diagram that shows an arrangement with multiple tags of FIG. that form a section of grid according to the first embodiment.

FIG. 3 shows an arrangement with multiple tags 30 that form a section 37 of grid that can cover a predetermined area. The left side of the figure shows antenna 31, the chip 32, the boundary 33 and the antenna connector 34 for each chip 30. The connection means 35, 36 have been omitted for ease of explanation. The right side of the figure shows a simplified view of the section 37 only showing the boundary 33 of each tag 30, and the chip 32 along with other chips that may be arranged outside the section but within the predetermined area. The section 37 only shows a central tag 30 surrounded by eight similar tags 30 for ease of explanation. It will be appreciated that each other tag 30 in the section may be surrounded by eight tags 30 and the grid may comprise a number of sections with fewer or more tags than shown in FIG. 3. As is shown in FIG. 3, the tags 30 are laid out across the surface of an area with each tag's antenna 31 being placed adjacent to its neighbours. One edge of a tag is closely packed with another tag such that one edge of a tag is adjacent an edge of another tag. Physical connections are made between the tag's chips 32 and the neighbouring tags 30. The energy recorded from all of the tags with shared borders or boundaries to the tag 30 are sent to the tag 30 as indicated by the arrow A. It should be noted that the central tag as shown in the figure will also share its value for recorded energy with its neighbouring tags i.e. the tags it is connected to, and this can be achieved through bidirectional communication being enabled for each tag. If the tag 30 has a neighbour that is recording a higher energy value than itself, then it will remain silent to the reader 20. If the tag 30 has a higher reading than any of its neighbours, then it is deemed to be the communication point and it will activate its normal NFC communication by responding to an initiation signal from the reader 20 (as in the mechanism of a prior art NFC tag or smartcard). It will be appreciated that any tag that is within range of the reader can be activated and has the potential to be the communication point with the reader. Such a tag will have sufficient power induced by the reader to carry out the above processing of values and then to self-deactivate if it is not the highest energy value within the group of tags that have received a signal from the reader. This may be used for a wide variety of applications such as announcing an identity or sharing payment information required to make an electronic payment. The number of tags in a network can vary and communication can be between only two tags. In some embodiments, at least three tags are provided. In other embodiments, at least five tags are provided. In a modification (not shown), power may be shared between other tags within a cluster of tags to carry out processing of values through the connection between tags.

Figure 4:
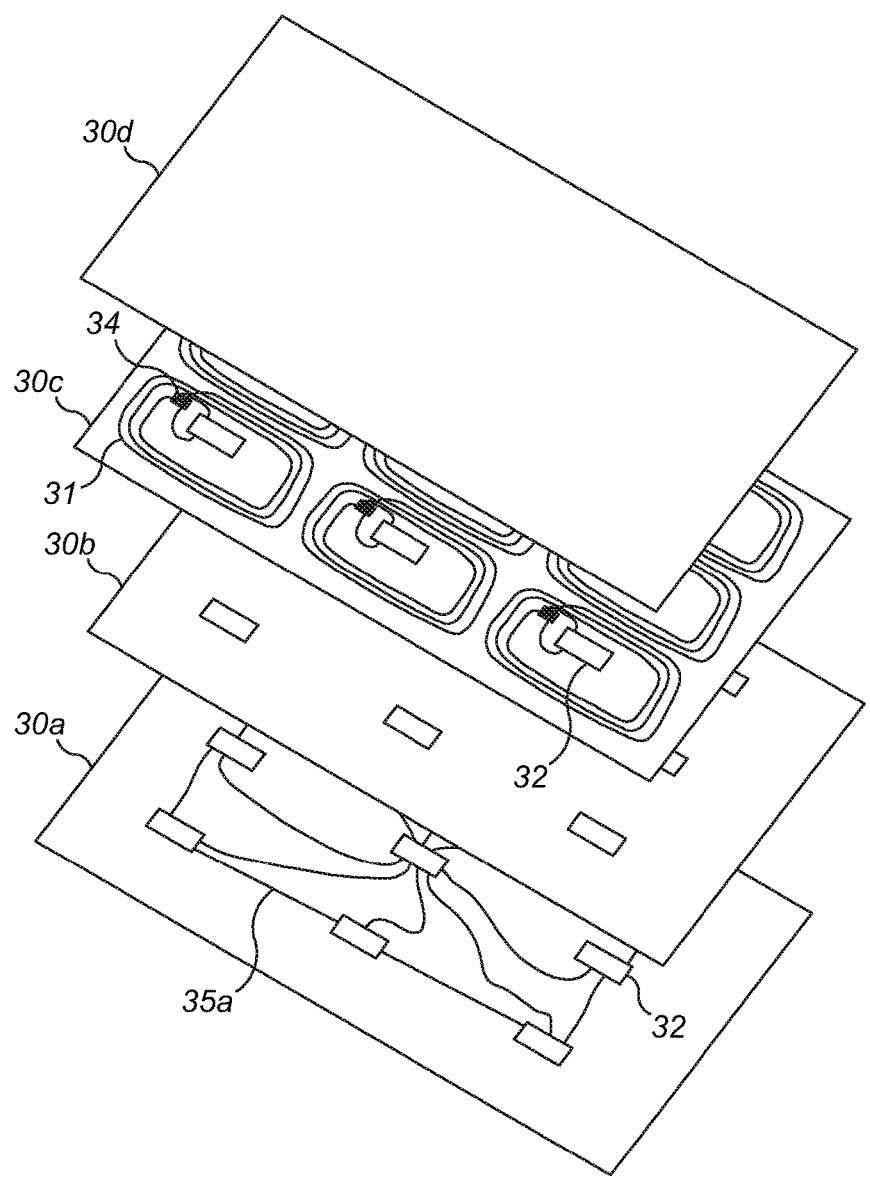
FIG. 4 shows an exploded view of a composite construction of a plurality of tags arranged adjacent each other in an embodiment.
Figure 5:
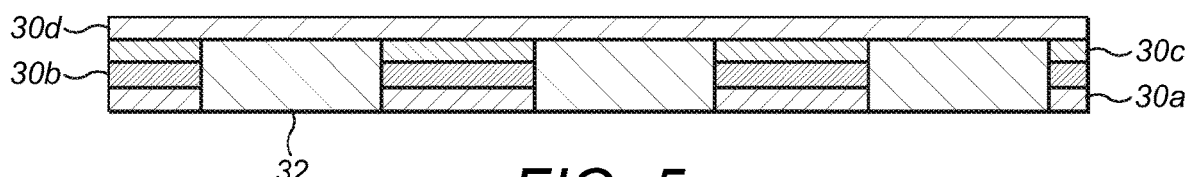
FIG. 5 shows side view of the composite construction of FIG. 4.

FIGS. 4 and 5 shows an embodiment of a construction of a plurality of tags 30. The tag 30 can have a composite structure with multiple layers. A data network layer 30a comprises the chip 32 and provides connections of the input and output connections means 35,36 between the chips 32 of the tags 30. The input and output connection means 35,36 are excluded from the figures for ease of explanation and the connection is shown as a combined connection path 35a, which is preferably bidirectional, between different tags. As mentioned, separate connections means are not required and a single interface could be provided and indeed could be integrated into the chip 32. An insulating layer 30b comprising the chip 32 and insulating material is provided on top of the data network layer 30a. A NFC antenna layer 30c is provided on top of the insulating layer 30b. The antenna layer 30c comprises the antenna 31, chip 32 and the antenna connector 34 (if provided). A protective coating layer 30d may be provided on top of the antenna layer 30*c*. The coating layer 30*d* comprises a transparent or opaque protective material and/or may be formed of a plastics material. The layer 30*d* may be a display screen or another layer that can display information such as a printed page. The chip 32 extends through the three layers 30*a*, 30*b*, 30*c* and can avoid interference between the antenna and communication means that is provided between chip 32 of each tag 30 in a network of tags. Different grade glues can be provided between the different layers. A message indicating tamper of the tag could be printed on one or more layers such that if an antenna is removed, a tamper message may be exposed from an underlying layer.

Figure 6:
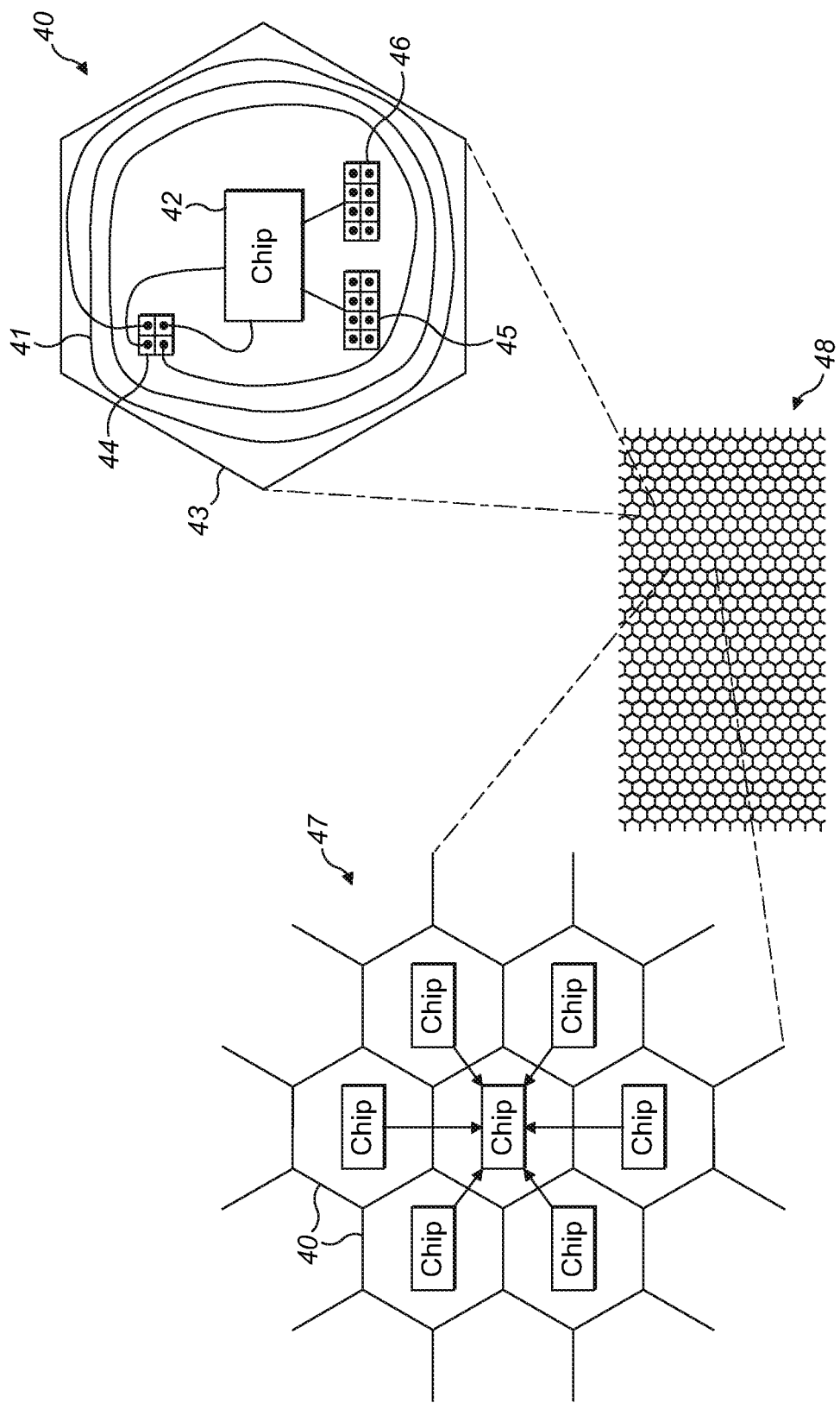
FIG. 6 is a diagram showing a section from a network of tags (section and network shown) and another embodiment of a tag with an alternative outer shape to that of FIG. 2.

FIG. 6 shows a section from a network of tags (section and network shown) comprising an alternative shape of a tag 40 which has the same functionality as tag 30. Similarly to tag 30, tag 40 comprises contains a NFC antenna 41 and a main microprocessor chip 42. The antenna 41 typically has a loop structure contained within a boundary 43 of the tag. The tag 40 may further include an antenna connector 44 to provide an interface between the antenna 41 and the chip 42. Both the antenna 41 and chip 42 are electrically connected to the antenna connector 44. In some other embodiments, the antenna may be directly connected to the chip. The tag comprises input connection means 45 and output connection means 46 similarly to FIG. 2.

It will be appreciated that different sections of the network of tags maybe provided over a particular area rather than tags covering the entire area depending on the functionality required over the area.

Differently to FIG. 2, the tag 40 has an alternative hexagonal boundary shape such that similarly to the tag section in FIG. 3, in a section 47, a tag 40 can be closely neighboured by six similar tags 40 in order to create a larger honeycomb network 48 (shown in more detail in FIG. 7) of tags 40. The neighbouring tags 40 of the main tag 40 which are positioned at equal distances main tag 40 in the section that is shown. The tags 40 operate in the same way are the tag 30 so the description will not be repeated here.

Figure 7:
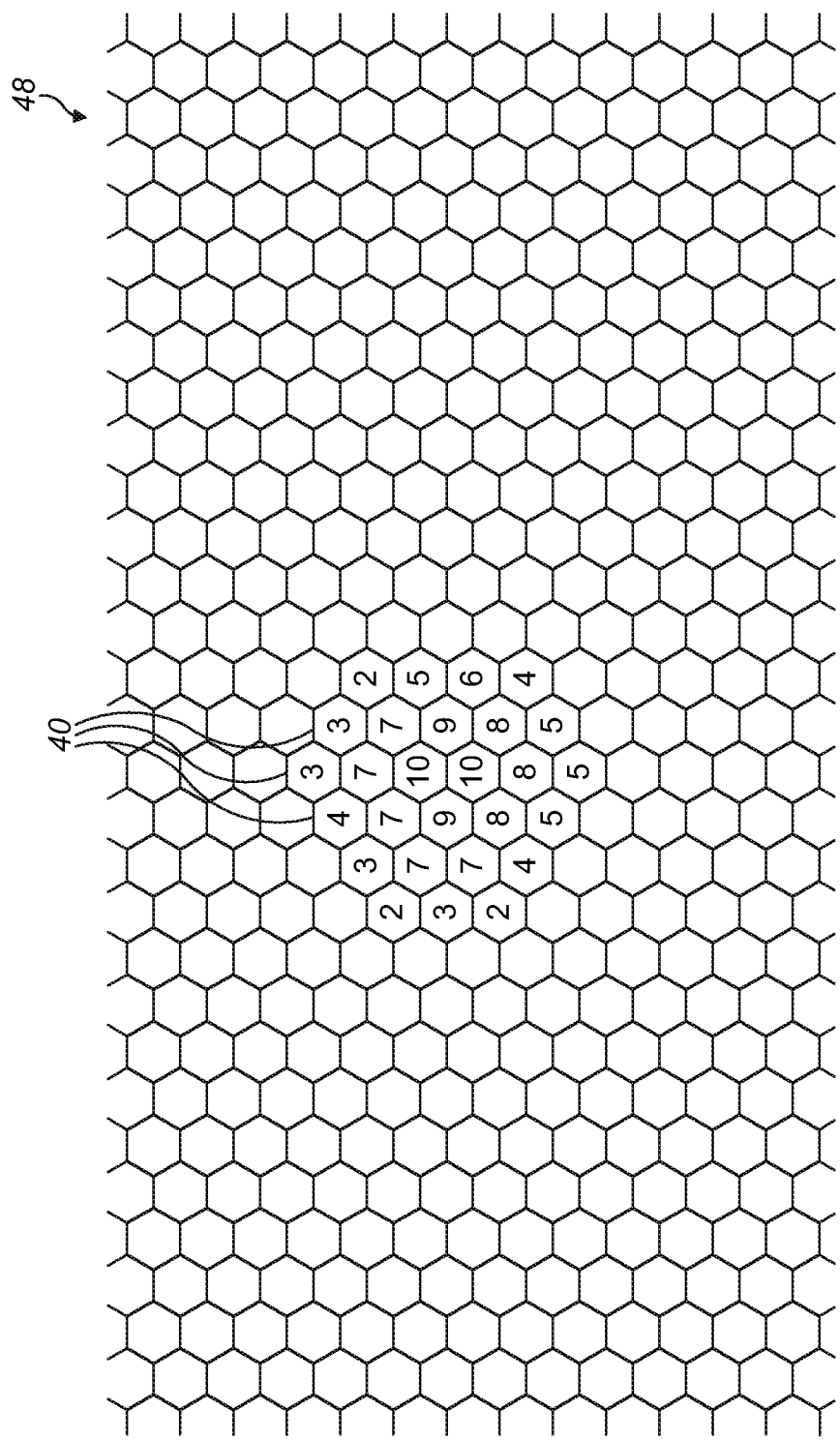
FIG. 7 is a flow diagram showing a simplified view of the honeycomb network of tags shown in FIG. 6.

FIG. 7 shows a simplified view of the honeycomb network 48 of tags shown in FIG. 6 covering a surface area. The area includes a plurality of tags 40. The tags 40 may be arranged within a housing covering the area. In this embodiment, the area is the same size as the size of the honeycomb network 48. In one embodiment, the housing is a mat which can be portable and located over different types of surface.

As mentioned previously, a value representing the energy received from the reader 20 (not shown in FIG. 7 but refer to FIG. 2 for an example reader 20) by a tag in a section of the network is shown. As with the tags shown in FIG. 2, the tags with the highest values can be used as a communication point for the reader 20. When the reader 20 is moved over a section of the NFC mat, for example, a cluster of tags 40 will become active. Each tag 40 will have a numeric value to represent the NFC radio signal energy available to the tag 40 as initiated by the reader 20. This will be highest at the centre of the reader's field. Only the tag with the highest value should accept the right to communicate with the reader 20.

In some embodiments, more than one tag 30, 40 in a section has an equal high value to a neighbouring tag. If this is the case, the average neighbour energy for each tag may also be taken into consideration before a selection of tag to communicate with the reader 20 is made. FIGS. 8*a* to 8*e* show examples of the values from tags in an activated cluster of tags in an example honeycomb network such as that in FIG. 7 and how a selection of a tag can be made where equal high value tags are present.

Figure 8A:
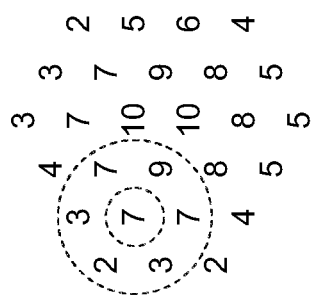
FIGS. 8*a* to 8*e* show examples of the values from tags in an activated cluster of tags in an example honeycomb network such as that in FIG. 7.
Figure 8B:
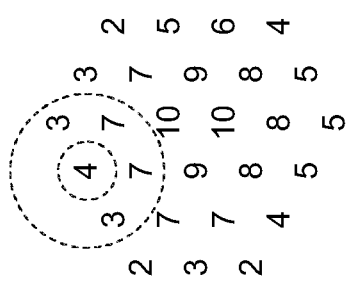
Figure 8C:
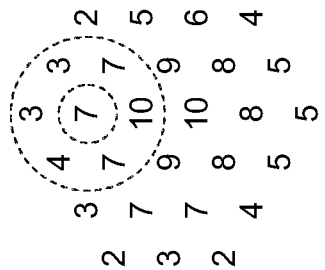
Figure 8D:
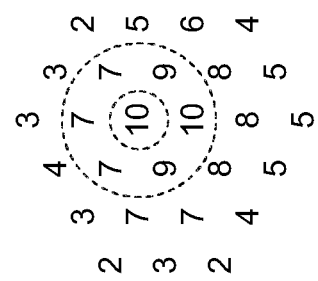
Figure 8E:
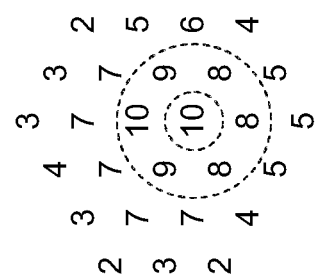

FIG. 8*a* shows a main central tag in a section with a value of 7. Its highest neighbour has a value of 9. The main tag has a neighbour with a higher value and therefore the main tag does not respond to the reader 20 and does not activate communication. FIG. 8*b* shows a main tag in a section that is at the edge of a cluster, the main tag having a value of 4. Its highest neighbour is 7. The main tag has a neighbour with a higher value and therefore the main tag does not respond to the reader 20 and does not activate communication. FIG. 8*c* shows a main tag in a section with a value of 7. Its highest neighbour is 10. The main tag has a neighbour with a higher value and therefore the main tag does not respond to the reader 20 and does not activate communication. FIG. 8*d* shows a main tag in a section with a value of 10. Its highest neighbour is 10. The main tag will therefore calculate an average value of the energy in neighbouring tags. The average value of its neighbours is 8.17. A weighted main tag value which is the sum of the main tag value and the average neighbour value can then be calculated. The weighted main tag value is 18.17. The weighted neighbour tag value is received by the main tag and a comparison can be made. In this example, the weighted neighbour tag value is 18.67. The neighbour has a higher weighted neighbour value and therefore the main tag in the section does not respond to or communicate with the reader 20. FIG. 8*e* shows a main tag in a section with a value of 10. Its highest neighbour is 10. The average value of its neighbours is 8.67. A weighted main tag value which is the sum of the main tag value and the average neighbour value is 18.67. The weighted neighbour tag value is 18.17. The main tag has the highest weighted value and responds to and communicates with the reader 20. The weighted value provides a modification to the simple value comparison which can also provide an indication of the best signal being received and in some cases, one of the tags with the highest received energy values may be arbitrarily selected.

An embodiment will now be described relating to the method corresponding to the system described above in relation to FIG. 6. Although tag 40 is referred to, it will be appreciated by the skilled person that the method also applies to other tags with similar functionality such as tag 30. According to the method, the electronic reading device 20 is brought into close proximity to the honeycomb network 48 of NFC tags 40 (typically a few centimetres such that at least one tag of the network can be read). Tags 40 that are within range of the reading device will receive electromagnetic signal from the reading device 20 that causes the tags 40 to become activated. Activation could be through power being generated to the tag through inductive coupling activation can be through some other means (e.g. causing a power supply in the tag to be activated). The tags 40 that receive the signal then determine a value representative of the reliability of the signal such as signal strength of the received signal. The tags 40 that receive the signal also receive values representative of the reliability of the signal from neighbouring tags to which the tags are connected. Therefore, at least a first value and second value representative of the reliability of the signal (if only two tags are activated) are received by a tag 40. Wireless communication with the reading device 20 is then initiated based on the first and second value. That is, the values are indicative of the tag 40 that should respond to the initiation signal from the reading device 20.

The invention can have a number of uses which will now be described. It will be appreciated by the skilled person that the invention is not limited to these uses and other uses are possible. Also although reference is made to tag 40, the tag 30 or another tag with similar functionality may alternatively or additionally used.

Figure 9:
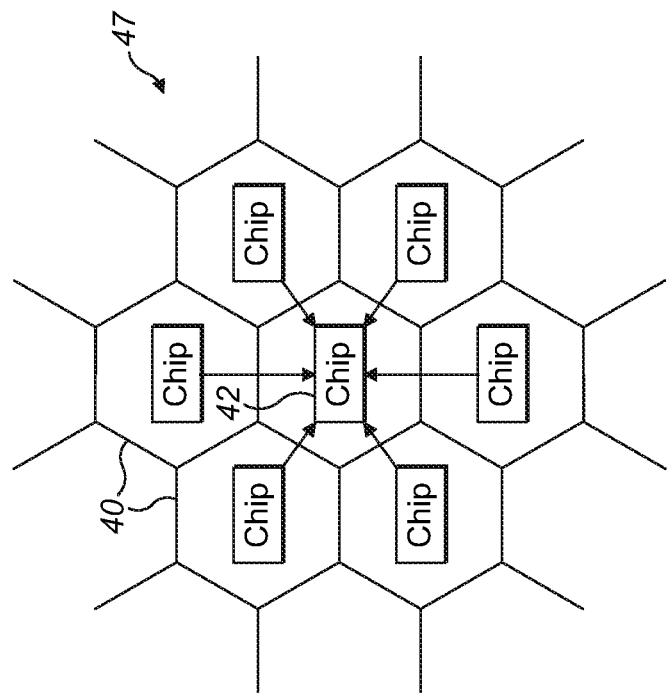
FIG. 9 is a diagram showing a first use case of the invention according to an embodiment.
Figure 9:
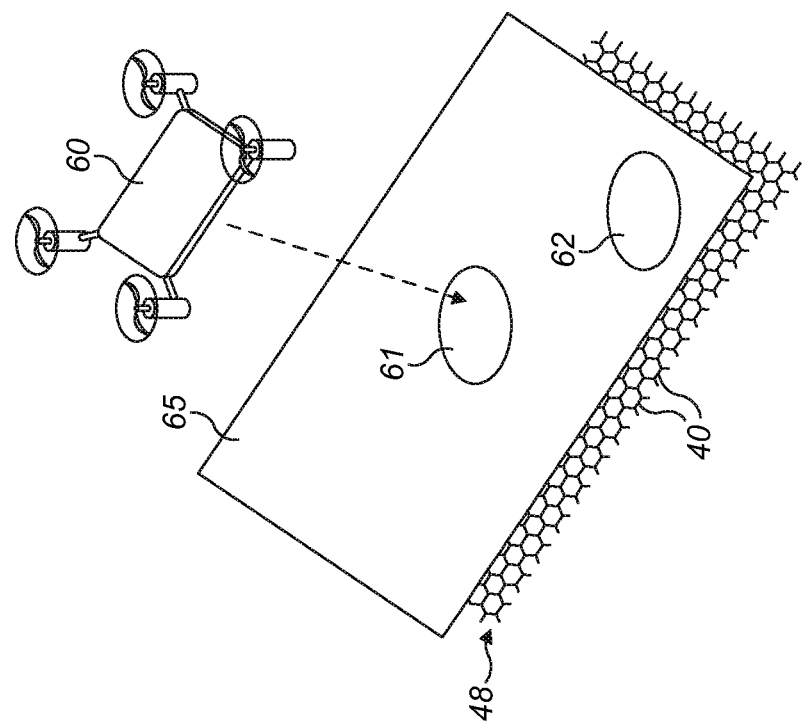

With reference to FIG. 9, one use is for extending the area within which a portable unmanned vehicle that includes a wireless electronic reading device is attempting to locate a NFC tag. In particular, a tag can be embodied in a contactless payment card. The network of tags are built into a landing pad for the self-propelling reading device to identify the landing pad as the target location and if appropriate to also make a payment. The portable unmanned vehicle that includes the reading device can be an unmanned aerial vehicle such as a delivery drone 60 that holds a payload for delivery. It will be appreciated that the reading device can be incorporated into other automated vehicles or devices such as unmanned land vehicles.

In the embodiment where the vehicle is a drone 60, the drone 60, which includes the functionality of the reader 20 described above, comes in to land at a location 61 on the NFC landing pad 65 which is formed of a plurality of tags 40 in a honeycomb network 48 as described above (an exploded view of the landing pad is shown). As in the structure shown in FIGS. 4 and 5, the landing pad may have a protective coating layer that comprises a transparent or opaque protective material and/or may be formed of a plastics material. A NFC-based payment terminal can attached to the drone 60. As the drone 60 lands on the landing pad 65 which may be provided as a mat, the NFC field from the drone's payment terminal will activate the tags 40 on the mat immediately under it (such as the cluster of tags shown in FIG. 7). The tags 40 will share the energy reading each is receiving with its immediate neighbours. The tag with the highest reading will then transmit identification data and if required EMV compliant payment data to the drone's payment terminal. If the card details match the card details expected for the intended delivery from the drone 60, then a payment will be made and the drone 60 can release its payload to make a delivery.

In this example, any tag 40 within the landing mat will be setup to provide the same identity and payment information, thus creating a wide area that the drone can land on. For example, landing at the location at a different part of the landing mat, as shown by area 62, would also enable a tag 40 that has the best energy reading from the plurality of tags in the network 48 to interact with the drone 60. A unique identification for each tag 40 may however also or alternatively be included in the messaging system if there is any reason to know where on the mat, the drone 60 has landed.

Figure 10:
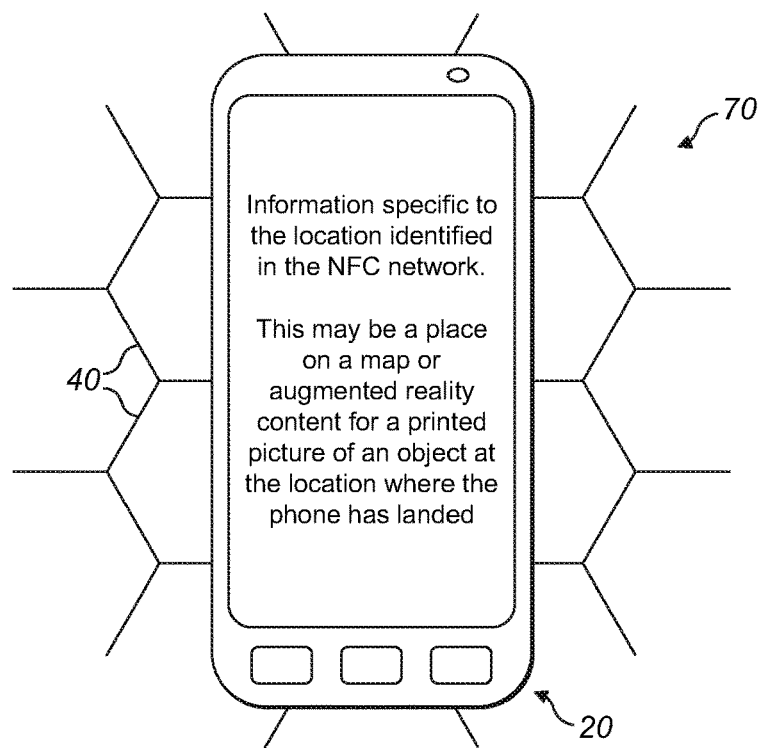
FIG. 10 is a diagram showing a second use case of the invention according to an embodiment.
Figure 11:
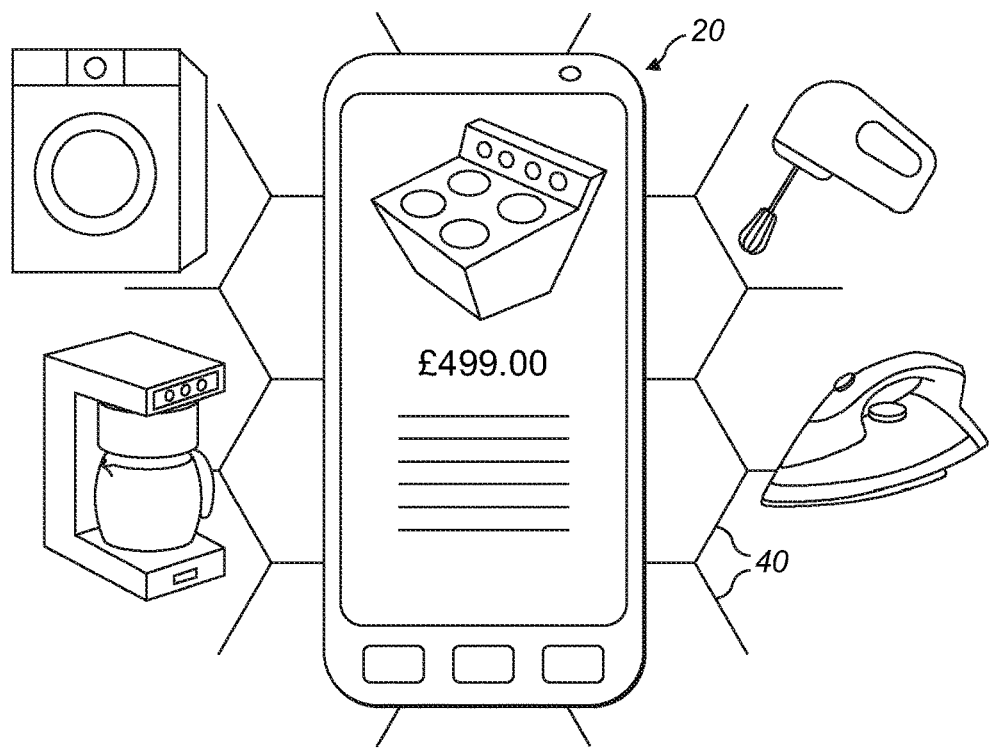
FIG. 11 is a diagram showing a third use case of the invention according to an embodiment.

Referring to FIGS. 10 and 11, a second use is where the NFC reader is in the mobile communication device 20. Each tag is integrated into or provided on a surface of a medium such as a mat 70 to provide information. Each tag 40 has a unique identifier that can be used to look up information specific to the location on the NFC mat 70. As the user places the device 20 on different parts of the mat, the user will be presented with information that is specific for that location.

As shown in FIG. 11, the network of tags can be fitted into a smart poster or a smart page of a catalogue. The page has a layer that is printed with product images. A network of tags is provided in the layer of the poster under the printed layer and will allow the user's device to read tags relating to each product. The NFC reader on the mobile device 20 will receive a tag identifier for the tag under the phone and retrieve the information relating to the product located above the tag on the page. The user may then proceed to purchase the product directly from the device 20.

Another example of this material would be to augment a static page with information displayed on the consumer's device. Information about points of interest on a map may for instance be displayed when the user places their phone on that point on the map. This could also be used to show animations on a device for static images on a page, or to add accessibility options, such as screen reading to a normal page of information. As is apparent, the system can determine accurately where a reading device has been placed on a piece of material such as paper, and can thereby create "augmented reality paper".

With the foregoing embodiments, the reader does not need to select a particular tag from a plurality of tags in a network. Instead, the tag network can self-determine which tag is receiving the most reliable signal and take further action by responding to the tag reader. The tag reader will therefore be acting in a conventional way as if only one tag is in close proximity to it. The NFC tags in the network will not all simultaneously attempt to communicate with the reader. This is particularly advantageous in an embodiment where the NFC tags are part of a contactless payment system and are embedded in a contactless payment instrument such as a payment smartcard. There is a much lower risk of a "card clash" which is known in the art where two or more smart cards or tags attempt to communicate at the same time. Such a "card clash" is avoided as only one electronic communication device of the network will attempt to reply to an initiation signal from the single electronic reading device.

The NFC tags themselves can determine where the NFC reader is likely positioned relative to the area in which the tags are located.

As will be apparent from the foregoing, advantageously, some embodiments of the invention can be used with a conventional NFC reading device. NFC passive tags have been described as particularly advantageous in the embodiments above but it will be appreciated that the invention could be embodied in any electronic communication device which receives electromagnetic energy from a reading device that is in close proximity which causes the electronic communication device to be powered or activated. In particular, active tags could instead be provided. Indeed, a network of active tags could be provided with similar functionality as in the above embodiments wherein signal strength or other information relevant to the location of a reading device is shared amongst neighbouring tags in order to determine the likely location of the reading device and activating only one of the active tags to communicate with the reading device.

Although being particularly suited to and described in the context of NFC, it will be appreciated by the skilled person with the benefit of the present disclosure that this invention could be implemented using another wireless communication protocol where two devices (i.e. a reading device and a target device) can wirelessly communicate. For example, the electronic devices are described in the context of NFC antennas which are known in the art. However, it will be appreciated that the invention is not limited to NFC antennas and that the disclosure is equally applicable to other types of wireless communication antennas that can provide the same functionality, e.g. RFID, Bluetooth antennas, also including any wireless communication standards not currently known but which are developed in the future but can provide communication between wireless communication devices.

Although the same wireless communication initiating or reading device is described in the embodiments, it will be appreciated that different wireless communication initiating or reading devices may be used to communicate with different clusters of electronic wireless communication devices, as long as electronic wireless communication devices have the capability to communicate and share one or more characteristics of the signals received by the electronic wireless communication devices with other electronic wireless communication devices.

It will be appreciated by those skilled in the art that the means as mentioned above can be implemented by specific electronic modules or components that carry out the functionality as described or a single programmable module programmed to carry out the functionality.

Numerous modifications, adaptations and variations to the embodiments described herein will become apparent to a person skilled in the art having the benefit of the present disclosure, and such modifications, adaptations and variations that result in additional embodiments of the present invention are also within the scope of the accompanying claims.

The invention claimed is:

1. An electronic wireless communication device, comprising:
   a wireless communication means for receiving a communication signal from a wireless communication initiating device;
   a monitoring means for monitoring the communication signal received by the wireless communication means and neighboring electronic wireless communication devices connected to connection means of the electronic wireless communication device; and
   a processing means for determining strength of the communication signal received by the wireless communication means and the neighboring electronic wireless communication devices to selectively activate the electronic wireless communication device or the neighboring electronic wireless communication devices to communicate with the wireless communication initiating device.

2. The electronic wireless communication device of claim 1, further comprising:
   an output connection means for transmitting a first characteristic value relating to the strength of the communication signal received by the electronic wireless communication device; and
   an input connection means for receiving a second characteristic value relating to the strength of the communication signal received by the neighboring electronic wireless communication devices.

3. The electronic wireless communication device of claim 2, further comprising:
   the processing means for comparing the first characteristic value and the second characteristic value to selectively activate the electronic wireless communication device upon determining the first characteristic value is higher than the second characteristic value, wherein the neighboring electronic wireless communication devices are deactivated.

4. The electronic wireless communication device of claim 2, further comprising:
   the processing means for comparing the first characteristic value and the second characteristic value to selectively activate at least one of the neighboring electronic wireless communication devices upon determining the second characteristic value is higher than the first characteristic value, wherein the electronic wireless communication device and remaining neighboring electronic wireless communication devices are deactivated.

5. The electronic wireless communication device of claim 1, wherein the connection means include an input connection means for receiving data and an output connection means for transmitting data, and wherein the connection means connects the electronic wireless communication device to the neighboring electronic wireless communication devices.

6. The electronic wireless communication device of claim 1, wherein a microprocessor chip of the electronic wireless communication device includes the monitoring means and the processing means.

7. The electronic wireless communication device of claim 6, wherein the communication signal is an electromagnetic energy that powers the microprocessor chip and data communication between the electronic wireless communication device, the neighboring electronic wireless communication devices, and the wireless communication initiating device.

8. The electronic wireless communication device of claim 1, wherein the electronic wireless communication device and the neighboring electronic wireless communication devices are near field communication (NFC) tags.

9. The electronic wireless communication device of claim 1, wherein the wireless communication initiating device is a near field communication (NFC) tag reading device.

10. The electronic wireless communication device of claim 1, wherein the wireless communication means is an antenna with a loop structure provided within a boundary of the electronic wireless communication device.

11. A computer-implemented method for selective communication between wireless communication devices, comprising:
    determining a communication signal from a wireless communication initiating device is received by an electronic wireless communication device and neighboring electronic wireless communication devices;
    processing the communication signal received by the electronic wireless communication device and the neighboring electronic wireless communication devices to generate characteristic values; and
    selectively activate the electronic wireless communication device or the neighboring electronic wireless communication devices to communicate with the wireless communication initiating device based on the characteristic values.

12. The method of claim 11, further comprising:
    receiving a first characteristic value relating to strength of the communication signal received by the electronic wireless communication device; and
    receiving a second characteristic value relating to the strength of the communication signal received by the neighboring electronic wireless communication devices.

13. The method of claim 12, further comprising:
    comparing the first characteristic value and the second characteristic value to selectively activate the electronic wireless communication device upon determining the first characteristic value is higher than the second characteristic value, wherein the neighboring electronic wireless communication devices are deactivated.

14. The method of claim 12, further comprising:
    comparing the first characteristic value and the second characteristic value to selectively activate at least one of the neighboring electronic wireless communication devices upon determining the second characteristic value is higher than the first characteristic value, wherein the electronic wireless communication device and remaining neighboring electronic wireless communication devices are deactivated.

15. The method of claim 11, wherein the electronic wireless communication device and the neighboring electronic wireless communication devices are arranged in an array covering a predetermined area and are electrically connected.

16. The method of claim 11, wherein the electronic wireless communication device and the neighboring electronic wireless communication devices are near field communication (NFC) tags.

17. The method of claim 11, wherein the wireless communication initiating device is a near field communication (NFC) tag reading device.

18. A system for selective communication between wireless communication devices, the system comprising:
   one or more processors;
   a data storage comprising instructions which, when executed by the one or more processors, cause the one or more processors to perform operations comprising:
      determining a communication signal from a wireless communication initiating device is received by an electronic wireless communication device and neighboring electronic wireless communication devices arranged in an array covering a predetermined area;
      processing the communication signal received by the electronic wireless communication device and the neighboring electronic wireless communication devices to generate characteristic values; and
      selectively activate the electronic wireless communication device or the neighboring electronic wireless communication devices to communicate with the wireless communication initiating device based on the characteristic values.

19. The system of claim 18, further comprising:

receiving a first characteristic value relating to strength of the communication signal received by the electronic wireless communication device; and receiving a second characteristic value relating to the strength of the communication signal received by the neighboring electronic wireless communication devices.

20. The system of claim 19, further comprising:

comparing the first characteristic value and the second characteristic value to: (i) selectively activate the electronic wireless communication device upon determining the first characteristic value is higher than the second characteristic value, wherein the neighboring electronic wireless communication devices are deactivated, or (ii) selectively activate at least one of the neighboring electronic wireless communication devices upon determining the second characteristic value is higher than the first characteristic value, wherein the electronic wireless communication device and remaining neighboring electronic wireless communication devices are deactivated.

* * * * *